US012695775B2

(12) United States Patent
Ueno et al.

(10) Patent No.: US 12,695,775 B2
(45) Date of Patent: Jul. 28, 2026

(54) VEHICLE SECURITY ANALYSIS APPARATUS, METHOD, AND PROGRAM STORAGE MEDIUM

(71) Applicants: NTT Docomo Business, Inc., Tokyo (JP); NTT Security (Japan) KK, Tokyo (JP)

(72) Inventors: Satoshi Ueno, Tokyo (JP); Atsushi Wakasugi, Yokohama (JP); Kensuke Nakata, Tokyo (JP); Yasunobu Chiba, Tokyo (JP)

(73) Assignees: NTT Docomo Business, Inc., Tokyo (JP); NTT Security (Japan) KK, Tokyo (JP)

( * ) Notice: Subject to any disclaimer, the term of this patent is extended or adjusted under 35 U.S.C. 154(b) by 79 days.

(21) Appl. No.: 18/583,163

(22) Filed: Feb. 21, 2024

(65) Prior Publication Data

US 2024/0236139 A1     Jul. 11, 2024

Related U.S. Application Data

(63) Continuation of application No. PCT/JP2022/035184, filed on Sep. 21, 2022.

(30) Foreign Application Priority Data

Sep. 24, 2021     (JP) ................................. 2021-155793

(51) Int. Cl.
*H04L 9/40*             (2022.01)
(52) U.S. Cl.
CPC ...... *H04L 63/1433* (2013.01); *H04L 63/1425* (2013.01)
(58) Field of Classification Search
CPC ............... H04L 41/142; H04L 63/1425; H04L 63/1433; H04L 41/042; G06F 21/55
See application file for complete search history.

(56) References Cited

U.S. PATENT DOCUMENTS 7,102,496 B1 *  9/2006  Ernst, Jr. .......... G08G 1/096725
                                                      340/436
10,630,699 B2 *  4/2020  Galula ................ H04L 63/1416
                        (Continued)

FOREIGN PATENT DOCUMENTS

CN        113302953 A      8/2021
EP        3 554 019 A1    10/2019
                (Continued)

OTHER PUBLICATIONS

Extended European Search Report issued Nov. 4, 2024, in corresponding European Patent Application No. 22872938.0, 8 pages.
(Continued)

*Primary Examiner* — Mohammad A Siddiqi
(74) *Attorney, Agent, or Firm* — Oblon, McClelland, Maier & Neustadt, L.L.P.

(57)             ABSTRACT

In the vehicle security analysis device, correspondence information representing correspondence between vehicle components and a plurality of analysis logics prepared in advance for each vehicle component is stored in a storage unit. Every time the analysis target data is acquired, the type of the vehicle component, which is the generation source of the analysis target data, is determined based on the vehicle identification information included in the attribute information in the acquired analysis target data, and the analysis logic corresponding to the determined type of the vehicle component is selected from the correspondence information. Then, the analysis target data is analyzed in accordance with the selected analysis logic to identify the type of the cyber-attack, and an analysis report including this result is generated and output.

7 Claims, 6 Drawing Sheets

(56) References Cited

U.S. PATENT DOCUMENTS

| | | | | |
|---|---|---|---|---|
| 11,296,965 | B2 | 4/2022 | Ujiie et al. | |
| 11,327,475 | B2 * | 5/2022 | Cella | G05B 13/028 |
| 11,363,045 | B2 | 6/2022 | Torisaki et al. | |
| 2017/0262709 | A1 * | 9/2017 | Wellington | G06V 10/764 |
| 2017/0276116 | A1 * | 9/2017 | Dölerud | F03B 13/10 |
| 2018/0266381 | A1 * | 9/2018 | Kosuge | F02P 15/10 |
| 2018/0272992 | A1 * | 9/2018 | Gage | G06V 20/56 |
| 2018/0316584 | A1 | 11/2018 | Ujiie et al. | |
| 2019/0215339 | A1 | 7/2019 | Chen | |
| 2019/0258993 | A1 * | 8/2019 | Olsen | H04W 4/029 |
| 2019/0312892 | A1 * | 10/2019 | Chung | G06F 21/554 |
| 2020/0053112 | A1 * | 2/2020 | Torisaki | H04L 63/1425 |
| 2020/0137580 | A1 * | 4/2020 | Yang | H04W 12/122 |
| 2020/0143053 | A1 * | 5/2020 | Gutierrez | G06F 21/554 |
| 2020/0247359 | A1 * | 8/2020 | Murray | G06N 20/00 |
| 2020/0364583 | A1 * | 11/2020 | Pedersen | G06N 5/02 |
| 2021/0044612 | A1 * | 2/2021 | Kawauchi | B60W 50/0225 |
| 2021/0226872 | A1 | 7/2021 | Ujiie et al. | |
| 2021/0237665 | A1 * | 8/2021 | Tamura | G06F 21/554 |
| 2021/0344700 | A1 | 11/2021 | Ueno et al. | |
| 2021/0344726 | A1 * | 11/2021 | Sharifi Mehr | H04L 63/1425 |
| 2021/0409434 | A1 | 12/2021 | Hasegawa et al. | |
| 2022/0182402 | A1 * | 6/2022 | Leslie | G06F 18/231 |
| 2022/0279005 | A1 | 9/2022 | Torisaki et al. | |
| 2022/0335340 | A1 * | 10/2022 | Moustafa | G06N 20/00 |
| 2024/0236131 | A1 * | 7/2024 | Ueno | G06F 21/552 |

FOREIGN PATENT DOCUMENTS

| | | |
|---|---|---|
| EP | 3 745 654 A1 | 12/2020 |
| EP | 4 024 249 A1 | 7/2022 |
| JP | 2020-119090 A | 8/2020 |
| WO | WO 2017/119246 A1 | 7/2017 |
| WO | WO 2019/142741 A1 | 7/2019 |
| WO | WO 2020/075801 A1 | 4/2020 |

OTHER PUBLICATIONS

International Preliminary Report on Patentability and Written Opinion issued Apr. 4, 2024, in PCT/JP2022/035184, 6 pages.
International Search Report issued Dec. 6, 2022 in PCT/JP2022/035184 filed on Sep. 21, 2022, 2 pages.

* cited by examiner

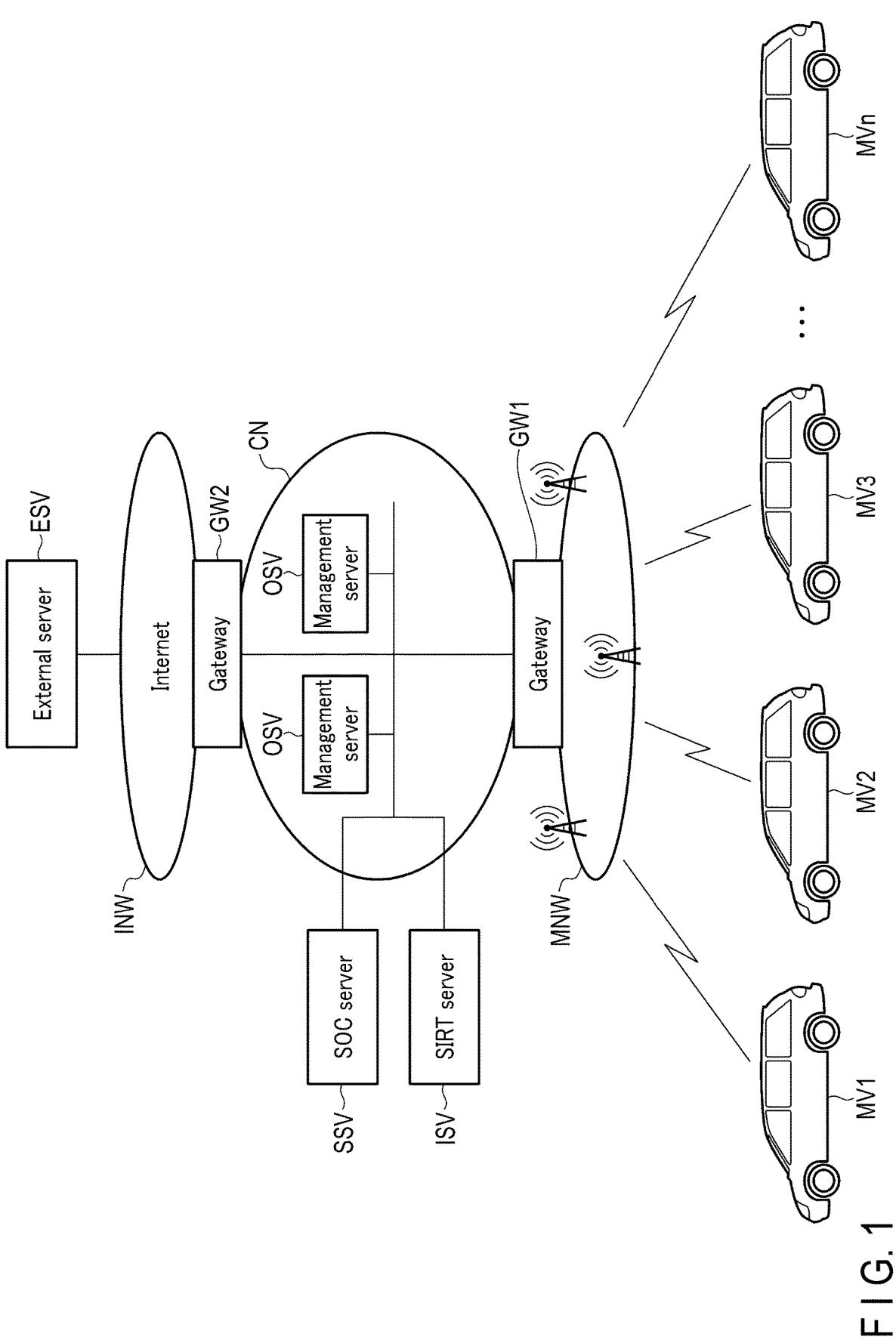
F I G. 1

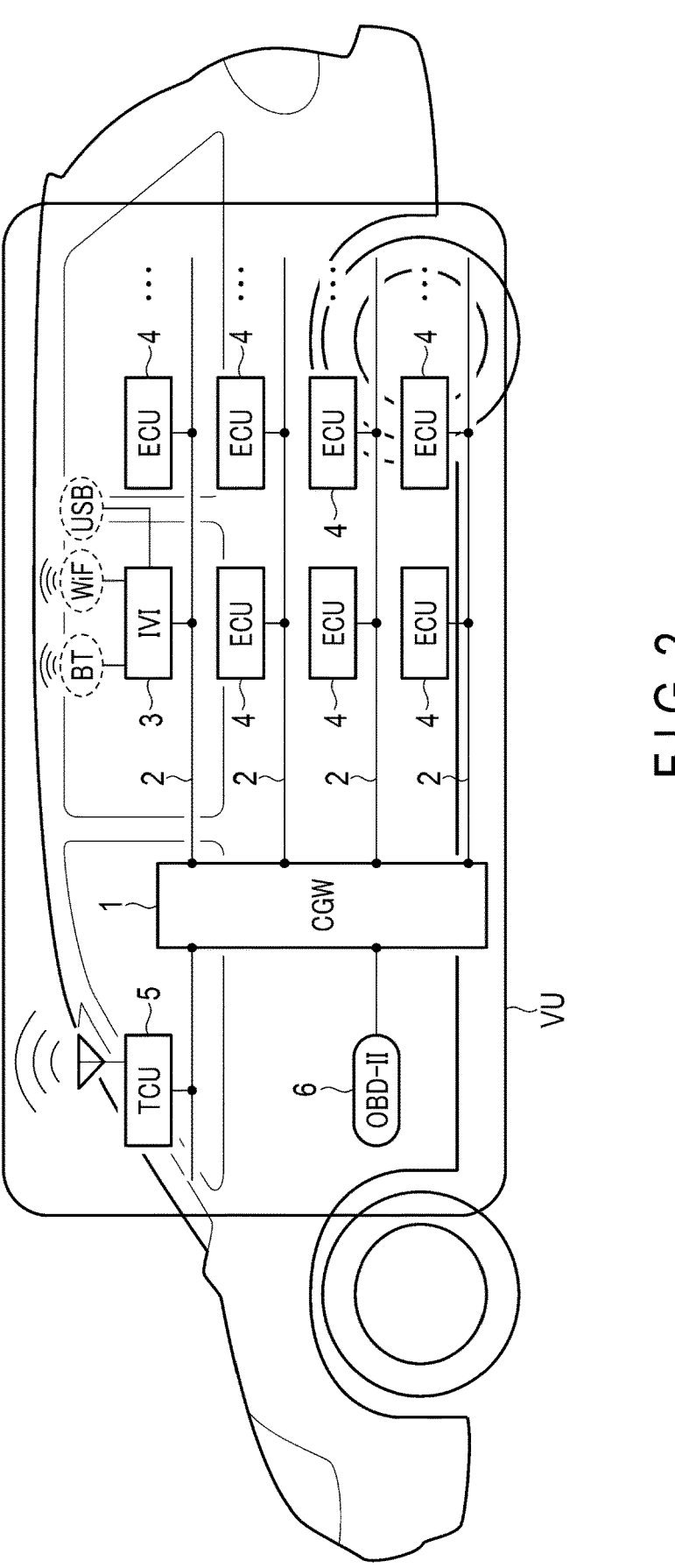
F I G. 2

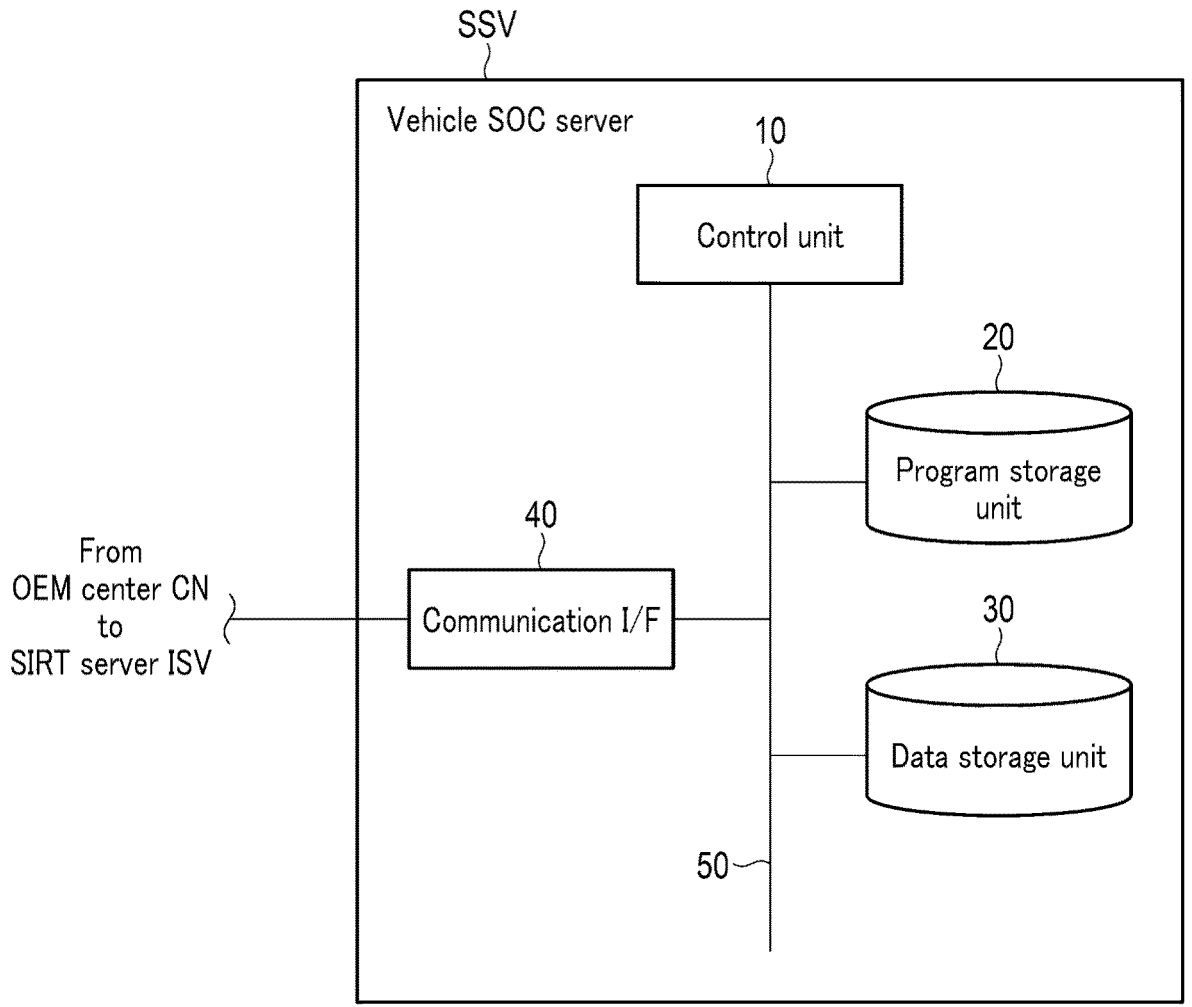
F I G. 3

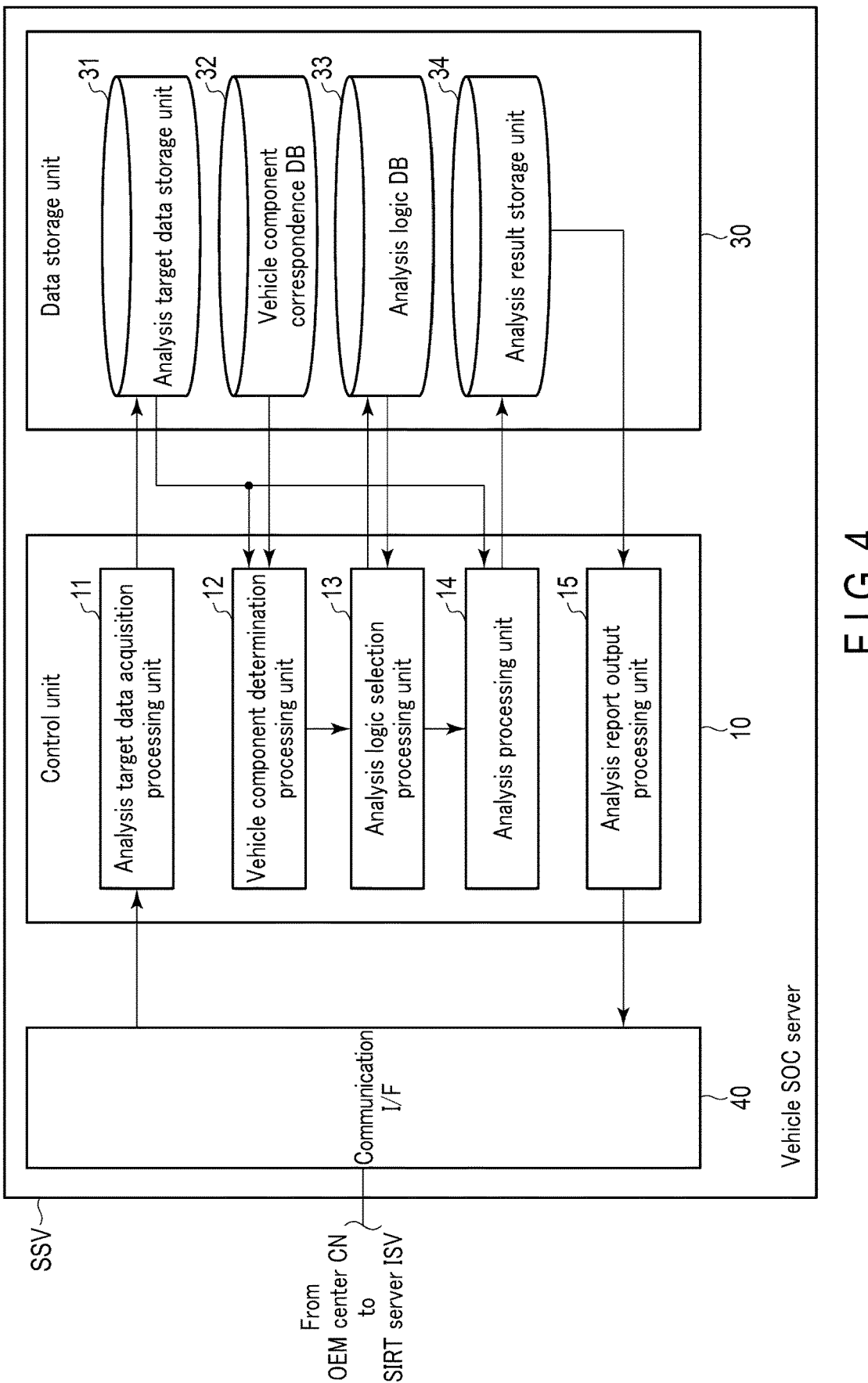
F I G. 4

⟨Vehicle component correspondence DB 32⟩

| Vehicle identification number | Vehicle component identifier |
|---|---|
| JP000000000000001 | A |
| JP000000000000002 | B |
| JP000000000000003 | C |
| JP000000000000004 | C |
| JP000000000000005 | B |
| JP000000000000006 | A |
| ... | ... |
| JP000000000001999 | C |
| JP000000000002000 | A |
| JP000000000002001 | B |
| JP000000000002002 | A |

F I G. 5

⟨Analysis logic DB 33⟩

| Vehicle component identifier | Analysis logic |
|---|---|
| A | IF(AND(SENSOR=1, DST="10.0.0.1"), "T001") |
| A | IF(AND(SENSOR=2, SIGNATURE=1), "T002") |
| A | IF(AND(SENSOR=2, SIGNATURE=2), "T003") |
| B | IF(AND(SENSOR=3, DST="10.1.0.2"), "T001") |
| B | IF(AND(SENSOR=3, DST="10.1.0.3"), "T002") |
| ... | ... |
| C | IF(AND(SENSOR=4, SIGNATURE=3), "T304") |
| C | IF(AND(SENSOR=4, SIGNATURE=4), "T304") |
| C | IF(AND(SENSOR=5, SRC="10.9.1.1"), "T305") |
| C | IF(AND(SENSOR=6, IN>1024), "T306") |

F I G. 6

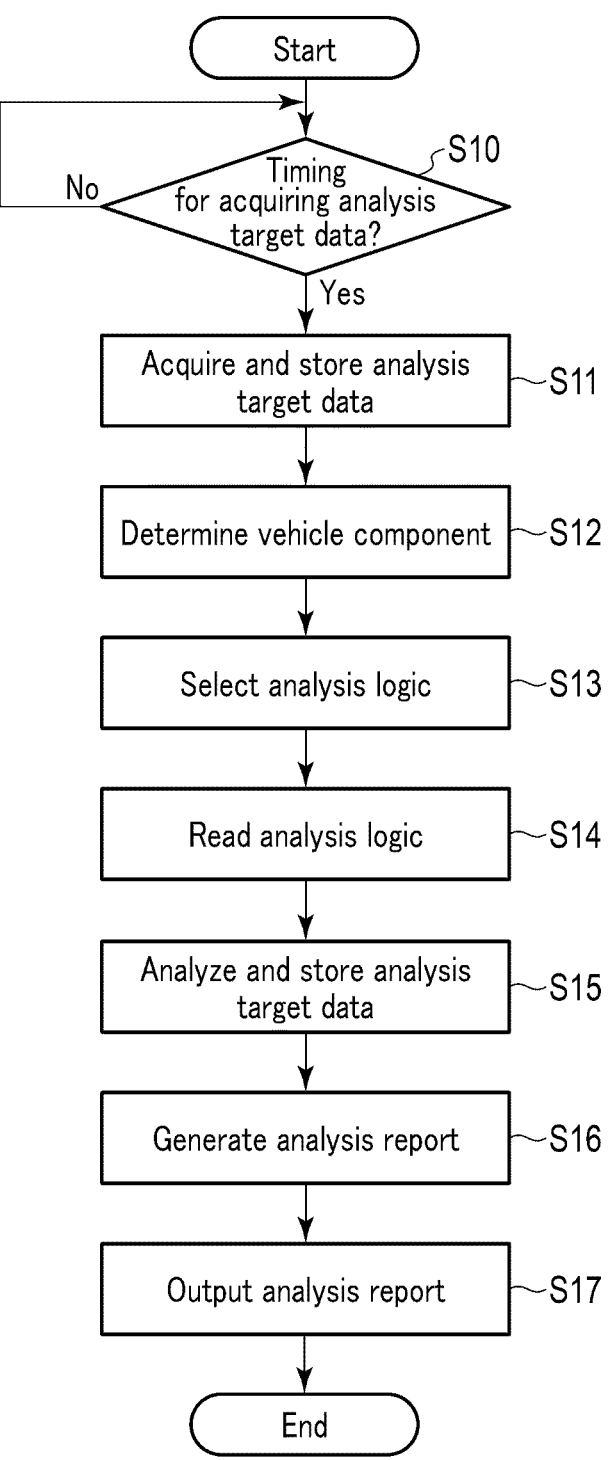
F I G. 7

VEHICLE SECURITY ANALYSIS APPARATUS, METHOD, AND PROGRAM STORAGE MEDIUM

CROSS REFERENCE TO RELATED APPLICATIONS

This application is a Continuation Application of PCT Application No. PCT/JP2022/035184, filed Sep. 21, 2022 and based upon and claiming the benefit of priority from Japanese Patent Application No. 2021-155793, filed Sep. 24, 2021, the entire contents of all of which are incorporated herein by reference.

FIELD

An aspect of the present invention relates to a vehicle security analysis apparatus for monitoring and analyzing the security state of an in-vehicle network constructed, for example, in a vehicle, and a method and a program storage medium.

BACKGROUND

In recent years, automobile manufacturers have been engaged in development of connected vehicles, which enable transmission and reception of various types of data between a server of an external network and an in-vehicle network including an electronic control unit (ECU). Connected vehicles are highly useful in realization of advanced services relating, for example, to updating of map data on a navigation system and automatic driving. These connected vehicles, however, are susceptible to cyberattacks through an external network, using malware, viruses, or the like due to the in-vehicle network that is connected to the external network.

For this reason, various techniques have been considered recently, with which a security operation center (SOC) is established to analyze types and details of cyberthreats/cyberattacks on an in-vehicle system. For instance, by installing a plurality of sensors in an in-vehicle device mounted on a monitoring target vehicle, sensor logs generated from these sensors are collected by the vehicle SOC via a network. In the vehicle Soc, the cyberthreats/cyberattacks on the in-vehicle device are analyzed based on the collected sensor logs (see Patent Document 1, for example).

CITATION LIST

Patent Literature

Patent Document 1: Jpn. Pat. Appln. KOKAI Publication No. 2020-119090

SUMMARY

Technical Problem

Types of monitoring target vehicles vary widely, and even among vehicles of the same types, the configurations of the in-vehicle devices mounted on the vehicles differ depending on the model year and grade of the vehicle. Furthermore, an in-vehicle device is generally provided with various types of sensors at various positions. Therefore, a vast number and types of log data items of various types are collected at the vehicle Soc, which considerably increases the processing load for the analysis at the vehicle SOC, while lowering the analysis throughput.

The present invention has been made in view of the above circumstances. One aspect of the present invention is to provide a technique for suppressing an increase in the load of processing required for the analysis of the analysis target data and suppressing a reduction in the analysis throughput even if the types of management target in-vehicle devices become diversified.

Solution to Problem

In order to solve the above problem, one aspect of the present invention is to offer an apparatus or a method for acquiring, via a network, analysis target data relating to an operation state of an in-vehicle device installed on a vehicle and connectable to the network and analyzing the analysis target data, wherein correspondence information indicating a correspondence between the vehicle and a plurality of analysis logics prepared in advance in correspondence with types of in-vehicle devices mounted on the vehicle is stored in a storage unit. Each time the analysis target data is acquired, the type of the in-vehicle device that serves as the generation source of the analysis target data is determined based on the attribute information included in the acquired analysis target data. Based on the correspondence information, the analysis logic corresponding to the determined type of the in-vehicle device is selected from the analysis logics. The analysis target data is analyzed according to the selected analysis logic so that information indicating the analysis result can be generated and output.

According to one aspect of the present invention, each time the analysis target data is acquired from the in-vehicle device, the analysis logic associated with the type of the generation source in-vehicle device is selected from a large number of analysis logics, and the analysis processing of the analysis target data is performed by the selected analysis logic. That is, the analysis target data items are distributed to analysis logics having functions corresponding to the analysis processing of the respective data items and are respectively processed in a distributed manner. For this reason, regardless of the types of the in-vehicle devices, it is possible to reduce the processing load applied through the analysis processing and to suppress a decrease in the throughput of the analysis processing, as compared with the case of analyzing all the analysis target data items, for example by using one integrated analysis logic or by selecting a plurality of analysis logics in a predetermined order.

Advantageous Effects of Invention

That is, according to one aspect of the present invention, it is possible to provide a technique capable of, even with the increased number of types of monitoring target in-vehicle devices, suppressing an increase in processing load applied through the analysis processing of analysis target data and degradation in the analysis throughput.

BRIEF DESCRIPTION OF THE DRAWINGS

FIG. 1 is a diagram showing the overall configuration of a vehicle security surveillance system including a vehicle security analysis apparatus according to an embodiment of the present invention.

FIG. 2 is a diagram showing an exemplary configuration of an in-vehicle device that is a cybersecurity analysis target in the system shown in FIG. 1.

FIG. 3 is a block diagram showing a hardware configuration of the vehicle security analysis apparatus according to the embodiment of the present invention.

FIG. 4 is a block diagram showing a software configuration of the vehicle security analysis apparatus according to the embodiment of the present invention.

FIG. 5 is a diagram showing an exemplary database provided in the vehicle security analysis device of FIG. 4, where the database represents the correspondence of vehicle components.

FIG. 6 is a diagram showing an exemplary analysis logic database provided in the vehicle security analysis device of FIG. 4.

FIG. 7 is a flowchart showing the procedure and details of the analysis processing executed by the vehicle security analysis apparatus shown in FIG. 4.

DETAILED DESCRIPTION

Embodiments of the present invention will be described below with reference to the drawings.

Embodiment

Configuration Example (1) System

FIG. 1 is a diagram showing an exemplary configuration of a vehicle security surveillance system according to an embodiment of the present invention.

The vehicle security surveillance system according to this embodiment includes an original equipment manufacturing (OEM) center CN operated by an automobile manufacturer, for example. In general, OEM centers CN are established for respective automobile manufacturers. Here, the OEM center CN of an automobile manufacturer will be discussed as an example.

The OEM center CN of the automobile manufacturer is configured to perform data transmission with a plurality of vehicles MV1 to MVn under the management of the manufacturer through a mobile communication network MNW and a gateway GW1. The OEM center CN, which includes a management server OSV, provides the vehicles MV1 to MVn with various services intended for the vehicles. Under the control of the management server OSV, the OEM center CN may collect sensor log data transmitted from the vehicles MV1 to MVn through the mobile communication network MNW and the gateway GW1 and provide the collected sensor log data to the in-vehicle SOC server SSV, which will be described later. The OEM center CN is also configured to distribute software to the vehicles MV1 to MVn and update the distributed software.

As the mobile communication network MNW, a cellular mobile communication network or a wireless local area network (LAN) may be used, which is not a limitation.

A vehicle security operation center (SOC) server SSV is connected to the OEM center CN of the automobile manufacturer. The vehicle SOC server SSV is adopted as a vehicle security analysis apparatus according to an embodiment of the present invention, whose functions will be described in detail later.

The OEM center CN of the automobile manufacturer is also connected to the Internet INW through a gateway GW2 so that data can be transmitted to and from the external server ESV via the Internet INW. The external server ESV may be operated and managed, for example, by the Automotive Information Sharing and Analysis Center (Auto-ISAC). The external server ESV includes a database that accumulates threat information relating to connected-vehicle-related cyberthreats and potential vulnerabilities to provide the information accumulated in this database to vehicle SOC servers SSV.

The vehicle security surveillance system further includes a Security Incident Response Team (SIRT) server ISV, which may be operated by an automobile manufacturer. The SIRT server ISV can perform data transmission with the OEM center CN of the corresponding automobile manufacturer and with the vehicle SOC server SSV.

The SIRT server ISV is operated by, for example, an automobile manufacturer or an organization (SIRT) for performing safety management, support, and incident response necessary throughout the development life-cycle of the in-vehicle device. The SIRT server ISV includes, for example, a threat information database that stores cyberthreat information unique to the automobile manufacturer so that the cyberthreat information can be transmitted to the vehicle SOC server SSV in response to a request from the vehicle SOC server SSV.

The SIRT server ISV presents, for example, a security analysis report provided from the vehicle Soc server SSV to the administrator of the SIRT. The SIRT server ISV has a function of, if the administrator of the SIRT inputs a course of action or the like determined for the specific automobile manufacturer based on the analysis report, transmitting a recall instruction including this course of action to the vehicles. The cyberthreat information may be defined by a combination of the type of threat and the degree of hazard. The analysis report may also be described using this combination of the type of threat and the degree of hazard.

(2) Devices (2-1) In-Vehicle Device VU

FIG. 2 is a block diagram showing an exemplary configuration of an in-vehicle device VU mounted in each of the vehicles MV1 to MVn.

The in-vehicle device VU includes a plurality of electronic control units (ECU) 4. An ECU 4 is connected to an in-vehicle gateway (CGW) 1 via an in-vehicle network 2, for example, which is referred to as a control area network (CAN). A communication control unit (TCU) 5 and a navigation apparatus (IVI) 3 are connected to this CGW 1.

Each ECU 4 causes the processor to execute a program so as to perform a predetermined control function, and is used, for example, as a device for controlling the engine, transmission, steering angle, accelerator, brake, or the like, a device for controlling the turn signal, lights, or wipers, a device for controlling the door locks and the opening and closing of windows, a device for controlling air conditioning, or the like. Each of the vehicles MV1 to MVn is provided with various in-vehicle sensors that monitor measurement data of various vehicle sensors relating to the operations of the vehicle such as a speed sensor, a temperature sensor, and a vibration sensor, and other in-vehicle states including the driver and the like, and exterior sensors that monitor the exterior state of the vehicle. The ECU 4 is also used as a device that acquires sensing data output from these sensors. The ECU 4 is further used as a device for monitoring the states of the autonomous driving control apparatus and the driver.

The TCU 5 is used for conducting communications between an in-vehicle device VU and the mobile communication network MNW using, for example, the Internet Protocol (IP). The TCU 5 may be used for transmitting and receiving telephone call data of a driver or a passenger, receiving navigation update data from a website, and transmitting log data representing a detection result of an operation state of each component of the in-vehicle device VU to the OEM center CN of the automobile manufacturer.

The IVI 3 includes a USB port and a wireless interface, having a function of writing and reading various kinds of data to and from a USB device (not shown) through the USB port, and transmitting and receiving data to and from a portable terminal such as a smartphone or transmitting and receiving data to and from the outside through the wireless interface. Examples of the wireless interface may include Bluetooth (trademark) and WiFi (trademark).

The in-vehicle device VU has an external interface port (OBD-II) 6. This OBD-II port 6 may be connected to a testing apparatus or a personal computer. The testing apparatus and personal computer may be used for testing ECUs 4 and installing an update program and control data on the ECU 4.

The CGW 1 performs an IP/CAN protocol conversion at the time of transmitting data between the TCU 5 and each of the ECUs 4, the IVI 3, and the OBD-II port 6.

One example of the in-vehicle device VU has been discussed above. The in-vehicle devices VU, however, differ in type, or in other words in configuration and function, depending on automobile manufacturers. In addition, the configuration and function differ, for example depending on the model type or model year even among vehicles of the same manufacturer.

(2-2) Vehicle SOC Server SSV

FIGS. 3 and 4 are block diagrams showing the hardware configuration and software configuration, respectively, of the vehicle SOC server SSV.

The vehicle SOC server has functions of, in place of the OEM center CN of the automobile manufacturer, analyzing cyberattacks that the vehicles MV1 to MVn have encountered and notifying the SIRT server ISV of the corresponding automobile manufacturer of the analysis result.

The vehicle SOC server SSV includes a server computer provided, for example, on a cloud and having a control unit 10, which adopts a hardware processor such as a central processing unit (CPU). The vehicle SOC server SSV is configured by connecting a storage unit, which has a program storage unit 20 and a data storage unit 30, and a communication interface (I/F) 40 to the control unit 10 via a bus 50.

The communication I/F 40 performs data transmission with the OEM center CN of the automobile manufacturer, the SIRT server ISV, and the external server ESV using a communication protocol defined by the networks MNW and INW under the control of the control unit 10.

As a storage medium, the program storage unit 20 is configured, for example, by combining a nonvolatile memory such as a hard disk drive (HDD) or solid state drive (SDD) to which writing and reading can be performed at any time with a nonvolatile memory such as a read only memory (ROM). In addition to the middleware such as the operating system (OS), the program storage unit 20 stores programs necessary to execute various controlling processes relating to the embodiment of the present invention.

The data storage unit 30 is configured by combining a non-volatile memory such as an HDD or an SSD which can be written and read at any time and a volatile memory such as a RAM (Random Access Memory). As storage areas necessary for implementing the embodiment of the present invention, the data storage unit 30 includes an analysis target data storage unit 31, a vehicle component correspondence database (hereinafter, "database" will be abbreviated as "DB") 32, an analysis logic DB 33, and an analysis result storage unit 34.

The analysis target data storage unit 31 is used for temporarily storing as analysis target data the sensor log data acquired from the OEM center CN of the automobile manufacturer.

The vehicle component correspondence DB 32 stores vehicle component identifiers corresponding to vehicle identification numbers (VIN) in association with the vehicle identification numbers individually assigned to all of the management target vehicles MV1 to MVn. FIG. 5 shows an exemplary correspondence between the vehicle identification numbers and the vehicle component identifiers stored in the vehicle component correspondence DB 32.

In association with each vehicle component identifier, the analysis logic DB 33 stores analysis logics corresponding to the vehicle component identifiers. An analysis logic is prepared specifically for each vehicle component, or in other words, each of the types of the in-vehicle devices VU mounted in the vehicles MV1 to MVn. FIG. 6 shows an exemplary correspondence between the vehicle component identifiers and the analysis logics stored in the analysis logic DB 33.

The analysis result storage unit 34 is used for temporarily storing information indicating the analysis result obtained by the analysis processing unit 14 of the control unit 10 described later in order to generate an analysis report.

As the processing functions according to the embodiment of the present invention, the control unit 10 includes an analysis target data acquisition processing unit 11, a vehicle component determination processing unit 12, an analysis logic selection processing unit 13, an analysis processing unit 14, and an analysis report output processing unit 15. All of these processing units 11 to 15 are realized by causing the hardware processor of the control unit 10 to execute a program stored in the program storage unit 20.

The analysis target data acquisition processing unit 11 executes the process of acquiring sensor log data transmitted from each of the vehicles MV1 to MVn via the OEM center CN and storing the acquired sensor log data in the analysis target data storage unit 31 as analysis target data.

The vehicle component determination processing unit 12 reads the sensor log data from the analysis target data storage unit 31 and extracts the vehicle identification number of the transmission source vehicle from the vehicle attribute information included in this sensor log data. By referring to the vehicle component correspondence DB 32, the vehicle component determination processing unit 12 executes the process of determining the vehicle component identifier corresponding to the vehicle identification number.

If the vehicle component correspondence DB 32 is configured to store a vehicle component identifier in association with vehicle model identification information in place of the vehicle identification number, the vehicle component determination processing unit 12 may extract the vehicle model identification information of the transmission source vehicle from the vehicle attribute information included in the sensor log data and find the corresponding vehicle component identifier using this vehicle model identification information from the vehicle component correspondence DB 32. That is, any information included in the vehicle attribute information may be used as long as the information can identify the vehicle component.

The analysis logic selection processing unit 13 searches the analysis logic DB 33 based on the vehicle component identifier determined by the vehicle component determination processing unit 12 to selectively read an analysis logic associated with this vehicle component identifier.

The analysis processing unit 14 analyzes sensor log data items stored in the analysis target data storage unit 31 based on the analysis logic selectively read by the analysis logic selection processing unit 13 to identify the type of cyberthreat/cyberattack that has occurred in the in-vehicle device VU. Then, the analysis processing unit 14 performs the process of storing the identified type of cyberthreat/cyberattack as the analysis result indicating information in the analysis result storage unit 34.

The analysis report output processing unit 15 generates an analysis report, using one or more analysis results stored in the analysis result storage unit 34. The analysis report output processing unit 15 further executes the process of transmitting the generated analysis report to the SIRT server ISV via the communication I/F 40.

Exemplary Operations

Next, an exemplary operation of the vehicle SOC server SSV configured as above will be described together with the overall operation of the vehicle security surveillance system.

(1) Detection of Cyberthreat/Cyberattack Relating to In-Vehicle Device VU

The types of cyberthreats/cyberattacks to an in-vehicle device VU may include:

(a) An attack that causes malware infection or the like to the communication devices (e.g., TCU 5 and IVI 3) of the in-vehicle device VU from a falsified website or an attacker's terminal via the Internet INW;

(b) An attack that causes an operation against the driver's intention by transmitting a malicious remote operation command from an external wireless communication device to the communication device (e.g., TCU 5 or IVI 3) of the in-vehicle device VU;

(c) An attack that involves an unauthorized connection of an external device such as a personal computer to the OBD-II port 6 and an input of an unauthorized command to an ECU 4 or the like from this external device to change the setting of the ECU 4, exploit the information of the ECU 4, or cause an operation against the driver's intention;

(d) An attack that involves a connection of a portable device such as a malware infected smartphone to a Bluetooth or WiFi wireless interface to transmit an unauthorized command to an ECU 4 or the like of the in-vehicle device VU, take over the OS, rewrite the firmware, or the like, using the portable device as a stepping stone; and (e) An attack that infects an application of the IVI 3 with malware to transmit an unauthorized command to an ECU 4 or the like of the in-vehicle device VU, take over the OS, rewrite the firmware, or the like.

The patterns of the cyberthreat/cyberattack may include the following different stages:

(1) Initial invasion: an exercise of infecting a communication device (TCU 5 or IVI 3) of the in-vehicle device VU with malware or the like;

(2) Infrastructure construction: an exercise of constructing a remote control infrastructure through C&C communications between a malware infected communication device (TCU 5 or IVI 3) and the attacker's server or terminal via the OEM center CN of an automobile manufacturer or the Internet INW;

(3) Internal invasion and investigation; an exercise of intruding into the TCU 5, IVI 3, or CGW 1 and investigating the inside thereof;

(4) Purpose execution: an exercise of extracting information from the TCU 5, IVI 3, or ECU 4, or attacking a server or the like connected to the OEM center CN or the Internet INW using the TCU 5 or IVI 3 as a stepping stone, and of remotely controlling a component of the in-vehicle device VU such as the ECU 4 via the TCU 5 or IVI 3; and (5) Initial invasion+purpose execution: an exercise of, after invading the TCU 5 or IVI 3, exploiting the information, attacking a server connected to the OEM center CN or the Internet INW using the in-vehicle device VU as a foothold, and remotely controlling the components inside the in-vehicle device VU, such as ECUs 4, without the above-described steps of infrastructure construction and internal invasion/investigation.

In consideration of the above types and patterns of cyberthreats/cyberattacks, the components in the in-vehicle device VU, such as TCU 5, IVI 3, ECUs 4, and CGW 1, are respectively provided with sensors.

For instance, the TCU 5 and IVI 3 are provided with sensors of a host installation type, which are configured to detect network-routed attacks at the TCU 5 or IVI 3. Such a sensor may have functions of detecting an attack by checking against threat intelligence or an IP reputation list (IP addresses), which is a list of malicious IP addresses; detecting the occurrence of an access (permission/rejection/discard) to a transmission/reception IP address or port, the occurrence of login success/failure, or the occurrence of a transmission/reception media access control (MAC) address, which does not normally occur, to be an abnormality; detecting a verification error log of the secure socket layer/transport layer security (SSL/TLS) certificates to be an abnormality; detecting the occurrence of a rejection log by verification of an identification filter in the CAN 2 to be an abnormality; detecting the detection by an IDS inspection logic in the CAN 2 to be an abnormality; and detecting the occurrence of a MAC-verification error in a CAN message to be an abnormality.

In addition, the TCU 5 and the IVI 3 are also provided with sensors for detecting an attack that has occurred in the TCU 5 and the IVI 3. The sensor of this type has, for example, a function of detecting what is detected by the anti-virus signature to be an attack, a function of detecting what is detected through the dynamic analysis/behavior detection of the sandbox to be an attack, a function of detecting a log at an attempt of implementing an execution prohibited file on the whitelist to be an abnormality, a function of detecting a signature mismatch detection log to be an abnormality, a function of detecting a login success/failure that does not normally occur to be an abnormality, a function of detecting an authorizing operation that does not normally occur to be an abnormality, a function of detecting execution/termination of a process that does not normally occur to be an abnormality, a function of detecting an increase in resource usage that does not normally occur to be an abnormality, and a function of detecting a signature mismatch at the time of secure boot to be an abnormality.

Each sensor transmits sensor log data indicating a detection result to the OEM center CN of the automobile manufacturer in real time or at a predetermined transmission timing.

Sensors are also installed in the OEM center CN of the automobile manufacturer. The sensor of this type detects, on the network, any attack on the in-vehicle device VU via the network, and has substantially the same functions as the aforementioned sensors of the host installation type.

(2) Analysis of Cyberthreats/Cyberattacks in Vehicle SOC Server SSV

FIG. 7 is a flowchart showing an exemplary procedure and details of the analysis processing executed by the control unit 10 of the vehicle SOC server SSV.

(2-1) Acquisition of Threat Information

Prior to the analysis processing, the control unit 10 of the vehicle SOC server SSV acquires information defining connected vehicles-related cyberthreats/cyberattacks, potential vulnerabilities, etc., or more specifically, information defining cyberthreats/cyberattacks with the threat types and the degree of hazard, from the external server ESV and the SIRT server ISV periodically or at an arbitrary timing. Then, the control unit 10 stores the acquired information as threat information in a threat information storage area (not shown) of the data storage unit 30.

The threat information may be acquired by an operation of accessing the external server ESV or the SIRT server ISV from the vehicle SOC server SSV, or the operation of receiving at the vehicle SOC server SSV the threat information transmitted by the external server ESV or the SIRT server ISV on a regular or irregular basis by a push method. The acquisition of the threat information is not essential and may be performed as needed.

(2-2) Acquisition of Analysis Target Data

In the in-vehicle device VU of each of the vehicles MV1 to MVn, as described above, the sensors installed in each component such as the TCU 5 and the IVI 3 monitor the operational abnormality or abnormal data caused by a cyberthreat/cyberattack. Upon detection of an operational abnormality or abnormal data, the sensor log data indicating this detection result is transmitted to the OEM center CN of the corresponding automobile manufacturer together with the vehicle attribute information including the vehicle identification numbers of the vehicles MV1 to MVn. The sensor log data may include information indicating the sensor that has detected the abnormal operation or abnormal data, and signature information or DST information.

Upon receipt of the sensor log data transmitted from the management target vehicles MV1 to MVn, the OEM center CN temporarily stores the received sensor log data, and then transfers the sensor log data to the vehicle Soc server SSV in response to an acquisition request from the vehicle SOC server SSV by polling or the like.

On the other hand, under the control of the analysis target data acquisition processing unit 11, the control unit 10 of the vehicle SOC server SSV waits until the acquisition timing of the analysis target data at step S10, and when the acquisition timing is reached, the control unit 10 transmits an acquisition request to the OEM center CN by polling or the like at step S11. In response to the acquisition request, the control unit 10 receives the sensor log data transmitted from the OEM center CN via the communication I/F 40, and tentatively stores the received sensor log data as analysis target data in the analysis target data storage unit 31.

Thereafter, the analysis target data acquisition processing unit 11 repeatedly executes the above-described sensor log data acquisition processing in the same manner at every acquisition timing. The analysis target data acquisition processing may be actively executed by polling from the vehicle SOC server SSV, or alternatively, may be passively executed in response to a notification from the OEM center CN.

(2-3) Determination of Vehicle Component

First, at step S12, the control unit 10 of the vehicle SOC server SSV reads the sensor log data from the analysis target data storage unit 31 under the control of the vehicle component determination processing unit 12 each time new sensor log data is acquired or at an arbitrary timing. Then, the control unit 10 extracts the vehicle identification number included in the vehicle attribute information from the read-out sensor log data, and determines the vehicle component identifier corresponding to the extracted vehicle identification number by referring to the vehicle component correspondence DB 32. For instance, when the vehicle identification number is "JP000000000000006" in the example shown in FIG. 5, the vehicle component identifier is determined to be "A".

(2-4) Selection of Analysis Logic

At step S13, the control unit 10 of the vehicle SOC server SSV searches the analysis logic DB 33 using the vehicle component identifier as a key and selects an analysis logic associated with the vehicle component identifier under the control of the analysis logic selection processing unit 13. Then, the control unit 10 reads the selected analysis logic from the analysis logic DB 33 and supplies it to the analysis processing unit 14.

For example, if the vehicle component identifier is "A", the control unit 10 selects all the analysis logics associated with the vehicle component identifier "A", and reads the selected analysis logics from the analysis logic DB 33 to supply to the analysis processing unit 14.

(2-5) Analysis Processing of Analysis Target Data

At step S15, the control unit 10 of the vehicle SOC server SSV reads the analysis target sensor log data from the analysis target data storage unit 31 under the control of the analysis processing unit 14. Then, the control unit 10 analyzes the read-out sensor log data according to the selected analysis logics. Here, the analysis processing unit 14 may execute the analysis processing by the multiple analysis logics in parallel. In this manner, even when a plurality of analysis logics are selected, the analysis results can be obtained from all the analysis logics within a short time.

An exemplary analysis process using the above analysis logics will be described by referring to the analysis logic shown in FIG. 6. It is assumed, for example, that the items included in the sensor log data are SENSOR=1 and DST="10.0.0.1". In this case, the cyberattack type will be identified as "T001" from the analysis logic IF(AND(SENSOR=1, DST="10.0.0.1"), "T001"). If the items included in the sensor log are SENSOR=2 and SIGNATURE=1, the type of the cyberattack will be identified as "T002" from the analysis logic IF(AND(SENSOR=2, SIGNATURE=1), "T002"). Similarly, if the items included in the sensor log are SENSOR=3 and SIGNATURE=2, the type of the cyberattack will be identified as "T003" from the analysis logic IF(AND(SENSOR=3, SIGNATURE=2), "T003").

The analysis processing unit 14 stores the information indicating the type of cyberattack identified by any of the analysis logics as described above in the analysis result storage unit 34 in association with the vehicle identification number and the vehicle component identifier.

(2-6) Generation and Output of Analysis Report

Finally, at step S16, the control unit 10 of the vehicle SOC server SSV reads the information indicating the type of the cyberattack, which is the analysis result, from the analysis result storage unit 34, and generates an analysis report based on the read-out information indicating the type of the cyberattack under the control of the analysis report output processing unit 15.

The analysis report may be generated according to the type of cyberattack identified from each of the sensor log data items, or may be generated by focusing on multiple items of sensor log data relating to the identical vehicle identification number or vehicle component identifier acquired within a predetermined analysis period and integrating the types of cyberattacks identified respectively from these items of sensor log data.

The analysis report output processing unit 15 transmits the generated analysis report to the SIRT server ISV operated by the corresponding automobile manufacturer through the communication I/F 40 based on the vehicle identification number or vehicle component identifier. Based on this analysis report, the SIRT server ISV instructs, for example, the vehicle SOC server SSV to take a temporary measure against the cyberattack, or instructs all vehicles having the vehicle component in question to take a permanent measure.

The vehicle SOC server SSV may be configured to inform the sensor log data transmission source vehicle of the information indicating the type of the cyberattack or information indicating a countermeasure against the cyberattack at the timing that the type of the cyberattack is identified. In this manner, it is possible to cause the in-vehicle devices VU of the vehicles MV1 to MVn that have encountered the cyberattack to execute a tentative measure against the cyberattack in real time.

(Functions and Effects)

As described above, the vehicle SOC server SSV according to the present embodiment acquires the sensor log data transmitted from the in-vehicle device VU of each of the management target vehicles MV1 to MVn via the OEM center CN, determines the vehicle component identifier from the vehicle component correspondence DB 32 using as a key the vehicle identification number included in the vehicle attribute information of the acquired sensor log data, and further searches the analysis logic DB 33 using this vehicle component identifier as a key to select an analysis logic associated with the vehicle component. By analyzing the sensor log data using this selected analysis logic, the type of the cyberattack that has occurred on the vehicle is identified, and an analysis report corresponding to the identified type of the cyberattack is generated and provided to the SIRT.

In the above manner, every time the sensor log data is acquired from the in-vehicle devices VU of the vehicles MV1 to MVn, an analysis logic prepared in advance corresponding to the generation source vehicle component, such as the type of the in-vehicle device VU, is selected from among a large number of analysis logics, and the analysis process of the sensor log data is performed according to the selected analysis logic. That is, each piece of sensor log data is distributed to the analysis logics respectively corresponding to the types of generation source vehicle components and is processed in a distributed manner.

For the above reason, the processing load on the vehicle SOC server SSV for the analysis processing can be reduced regardless of the types of the in-vehicle devices VU, and a decrease in the throughput of the analysis processing can be suppressed, as compared with the case of analyzing the sensor log data using one integrated analysis logic, or the case of selecting a plurality of analysis logics in a predetermined order for the analysis processing.

In other words, when a vehicle SOC server SSV is analyzing cyberattacks that have occurred on the in-vehicle devices mounted on vehicles of various types or model years, an increase in the processing load for the analysis processing of the sensor log data and a decrease in analysis throughput can be suppressed.

Other Embodiments (1) According to the embodiment, when a plurality of analysis logics are selected by the analysis logic selection processing unit 13, the analysis processing unit 14 executes analysis processes in parallel by the selected analysis logics. The present invention, however, is not limited to this, and the analysis processes by the analysis logics may be executed in series. In this manner, it is possible to suppress the processing load of the vehicle SOC server SSV per unit time in the analysis of one sensor log data item.

Furthermore, in the analysis processes executed using the analysis logics in series, the following priority process may be adopted. That is, the ratio of attack detection in the past by each of the analysis logics corresponding to a vehicle component may be calculated for each vehicle component, and the calculated attack detection ratio may be stored as priority information used for determining the order of the analysis processes. At the start of the analysis processing by the analysis logics, the analysis processes are executed by selecting analysis logics in order of decreasing attack detection ratio according to the priority information, and the analysis processes are terminated when the type of the cyberattack is detected.

In this manner, despite the analyzing processes executed by the plurality of analysis logics in series, it is possible to shorten the average time period required for identifying the type of attack. Furthermore, since the analyzing processes are terminated at the timing when the type of cyberattack is identified, it is possible to lessen the processing load on the vehicle SOC server and to shorten the average time period for processing, in comparison with the case of the analyzing processes executed by all the selected analysis logics.

(2) According to the above embodiment, the sensor log data generated in the in-vehicle device VU is acquired via the network MNW and the OEM center CN. The present invention, however, is not limited thereto. For instance, the sensor log data generated in the in-vehicle device VU in an auto repair shop or the like may be stored in a storage medium and provided to the vehicle SOC server SSV so that the vehicle SOC server SSV can read the sensor log data from the provided recording medium and execute analysis processing.

The present invention can be modified and implemented in various manners without departing from the scope of the present invention, with regard to the functional configuration of the vehicle SOC server, the configuration of the sensor log data, the type and number of analysis logics prepared for each vehicle component, the configuration of the analysis logic, the method of selecting analysis logics, the procedure and details of the analysis processing, the type of identification target cyberattack, and the like.

The embodiments of the present invention have been described in detail above. The foregoing description is merely an example of the present invention in all respects. Various improvements and modifications can be added without departing from the scope of the invention. In other words, a specific configuration according to the embodiment may be adopted as appropriate in implementation of the present invention.

The present invention should not be limited to the above-described embodiments as-is, but may be embodied by modifying the components without departing from the scope of the invention at the implementation stage. In addition, various inventions may be constituted by appropriately combining a plurality of components disclosed in the embodiments. For example, some components may be omitted from the components shown in the embodiments. Furthermore, the components of different embodiments may be suitably combined.

REFERENCE SIGNS LIST

MV1 to MVn Vehicles
VU In-vehicle device
SSV Vehicle SOC server
ISV SIRT server
CN OEM center of automobile manufacturer
OSV Management server
MNW Mobile communication network
INW Internet
GW1, GW2 Gateway
ESV External server
1 In-vehicle gateway
2 In-vehicle network (CAN)
3 Navigation device (IVI)
4 Electronic control unit (ECU)
5 Communication control unit (TCU)
10 Control unit
11 Analysis target data acquisition processing unit
12 Vehicle component determination processing unit
13 Analysis logic selection processing unit
14 Analysis processing unit
15 Analysis report output processing unit
20 Program storage unit
30 Data storage unit
31 Analysis target data storage unit
32 Vehicle component correspondence DB
33 Analysis logic DB
34 Analysis result storage unit
40 Communication interface (communication I/F)
50 Bus

What is claimed is:

1. A vehicle security analysis apparatus configured to acquire and analyze analysis target data relating to an operation state of an in-vehicle device mounted on a vehicle and connectable to a network, the apparatus comprising:
    a memory configured to store correspondence information that indicates a correspondence between the vehicle and a plurality of analysis logics prepared in advance in correspondence with types of the in-vehicle device mounted on the vehicle, each analysis logic defines a logical function applied to specific sensor log data values for identifying existence of a particular type of cyberattack for a specific respective type of in-vehicle device, such that the plurality of logical functions have different input values from each other of different sensors among a plurality of sensors mounted on the vehicle; and
    processing circuitry configured to
        each time the analysis target data is acquired, determine a type of the in-vehicle device, which is a generation source of the analysis target data, based on attribute information of the vehicle included in the acquired analysis target data;
        select an analysis logic corresponding to the determined type of the in-vehicle device from the analysis logics based on the correspondence information;
        analyze the analysis target data in accordance with the selected analysis logic and generate information indicating an analysis result; and
        output the information indicating the analysis result.

2. The vehicle security analysis apparatus according to claim 1, wherein the memory stores first correspondence information indicating a correspondence between vehicle attribute information relating to a configuration of the vehicle and information for identifying a type of the in-vehicle device, and second correspondence information indicating a correspondence between the information for identifying the type of the in-vehicle device and the analysis logic, and
the processing circuitry
    extracts vehicle identification information from the attribute information included in the acquired analysis target data and determines the type of the corresponding in-vehicle device from the first correspondence information based on the extracted vehicle identification information, and
    selects a corresponding analysis logic from the second correspondence information based on information for identifying the type of the selected in-vehicle device.

3. The vehicle security analysis apparatus according to claim 1, wherein
    when a plurality of analysis logics corresponding to the type of the in-vehicle device are selected, the processing circuitry analyzes the analysis target data by executing analysis processes in parallel in accordance with the selected analysis logics.

4. The vehicle security analysis apparatus according to claim 1, wherein
    when a plurality of analysis logics corresponding to the type of the in-vehicle device are selected, the processing circuitry analyzes the analysis target data by executing analysis processes sequentially based on priority information set in advance in accordance with the selected analysis logics.

5. The vehicle security analysis apparatus according to claim 4, wherein
    the processing circuitry adopts an attack detection rate of a previous attack detection using each of the analysis logics as the priority information and analyzes the analysis target data by executing analysis processes in accordance with the plurality of analysis logics in order of decreasing attack detection rate.

6. A non-transitory program storage medium storing a program for causing a processor included in the vehicle security analysis device to execute processing by the processing units included in the vehicle security analysis apparatus according to claim 1.

7. A vehicle security analysis method executed by an apparatus for acquiring and analyzing analysis target data relating to an operation state of an in-vehicle device mounted on a vehicle and connectable to a network, the method comprising:
    establishing, in a memory, correspondence information indicating a correspondence between the vehicle and a plurality of analysis logics prepared in advance in correspondence with types of the in-vehicle device mounted on the vehicle, each analysis logic defining a logical function applied to specific sensor log data values for identifying existence of a particular type of cyberattack for a specific respective type of in-vehicle device, such that the plurality of logical functions have different input values from each other of different sensors among a plurality of sensors mounted on the vehicle;
    determining a type of the in-vehicle device, which is a generation source of the analysis target data, based on attribute information of the vehicle included in the acquired analysis target data every time the analysis target data is acquired;

selecting an analysis logic corresponding to the determined type of the in-vehicle device from the analysis logics based on the correspondence information;

analyzing the analysis target data in accordance with the selected analysis logic and generating information indicating an analysis result; and outputting the information representing the analysis result.

* * * * *